J. ALTRICHTER.
MEANS FOR OPENING AND CLOSING CARRIAGE WINDOWS.
APPLICATION FILED MAY 7, 1908.

948,603.

Patented Feb. 8, 1910.
4 SHEETS—SHEET 1.

WITNESSES.

INVENTOR,
JOHANN ALTRICHTER,
by van Oldeneel & Schoenlank
Attorneys.

J. ALTRICHTER.
MEANS FOR OPENING AND CLOSING CARRIAGE WINDOWS.
APPLICATION FILED MAY 7, 1908.
948,603.
Patented Feb. 8, 1910.
4 SHEETS—SHEET 2.
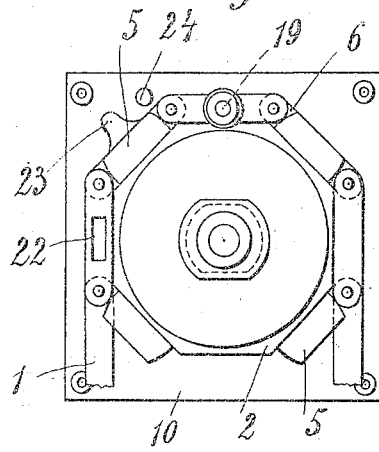
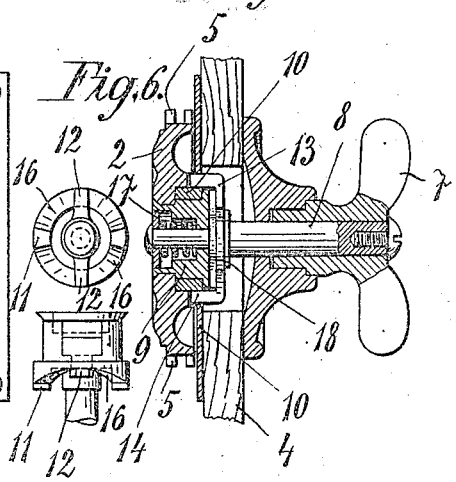
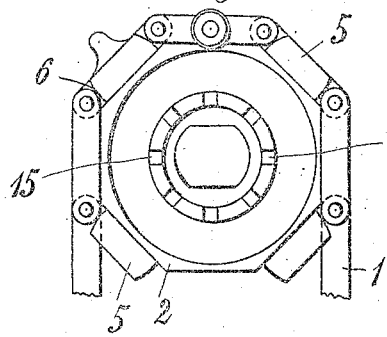
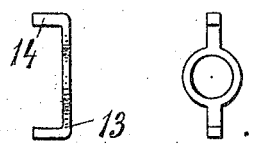
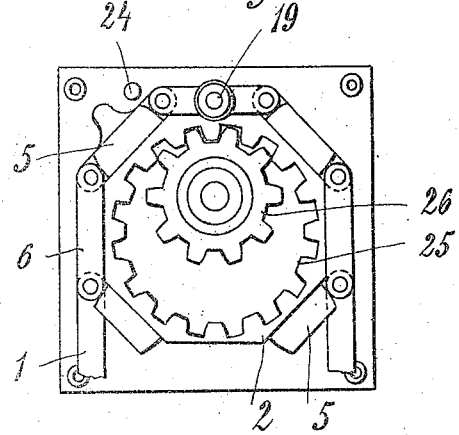
WITNESSES:
INVENTOR,
JOHANN ALTRICHTER,
by van Ildennest & Schoenlank
Attorneys.

J. ALTRICHTER.
MEANS FOR OPENING AND CLOSING CARRIAGE WINDOWS.
APPLICATION FILED MAY 7, 1909.
948,603.
Patented Feb. 8, 1910.
4 SHEETS—SHEET 3.
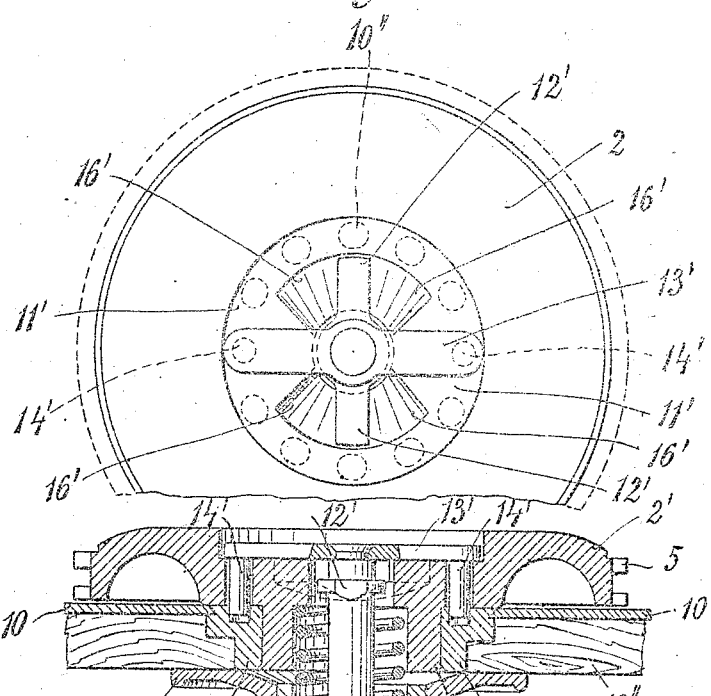
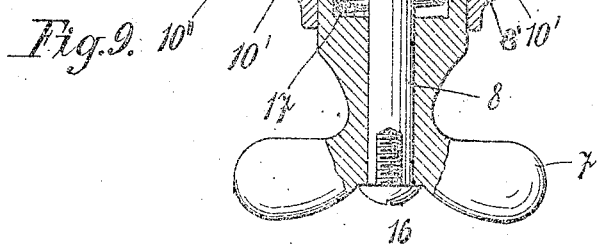
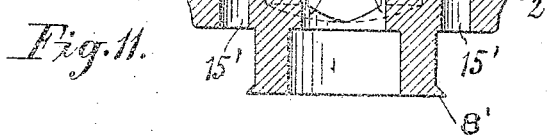
WITNESSES
INVENTOR,
JOHANN ALTRICHTER,
by
Attorneys.

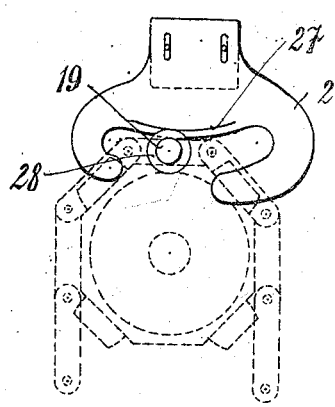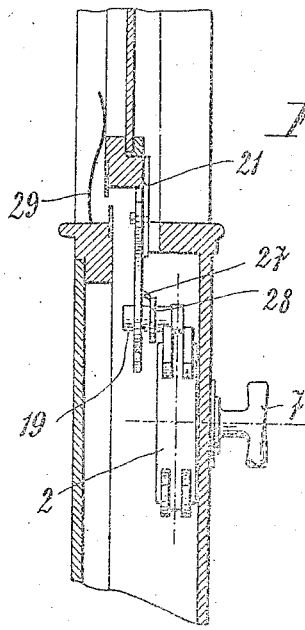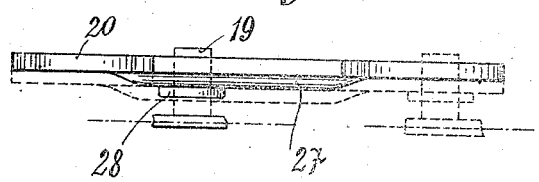

UNITED STATES PATENT OFFICE.

JOHANN ALTRICHTER, OF JUDENBURG, AUSTRIA-HUNGARY, ASSIGNOR TO ADOLF SCHIEL AND FRIEDRICH SCHWANK, OF VIENNA, AUSTRIA-HUNGARY.

MEANS FOR OPENING AND CLOSING CARRIAGE-WINDOWS 948,603.     Specification of Letters Patent.     Patented Feb. 8, 1910.

Application filed May 7, 1908. Serial No. 431,446.    REISSUED

*To all whom it may concern:*

Be it known that I, JOHANN ALTRICHTER, of Judenburg, crown-land Styria, Austria-Hungary, locksmith, a subject of the Emperor of Austria-Hungary, have invented a new and useful Improvement in Means for Opening and Closing Carriage-Windows; and I do hereby declare the following to be a full, clear, and exact description of the same.

The object of my invention relates to improvements in means for opening and closing carriage windows, in which the window is moved by means of a chain gear.

The improvements refer more particularly to the working of the chain pinion and the locking arrangement for securing the latter in position, and further the formation of the plate to be attached to the window, for the cam arrangement provided on the chain, and lastly, the formation of the chain-pinion.

Figure 1:
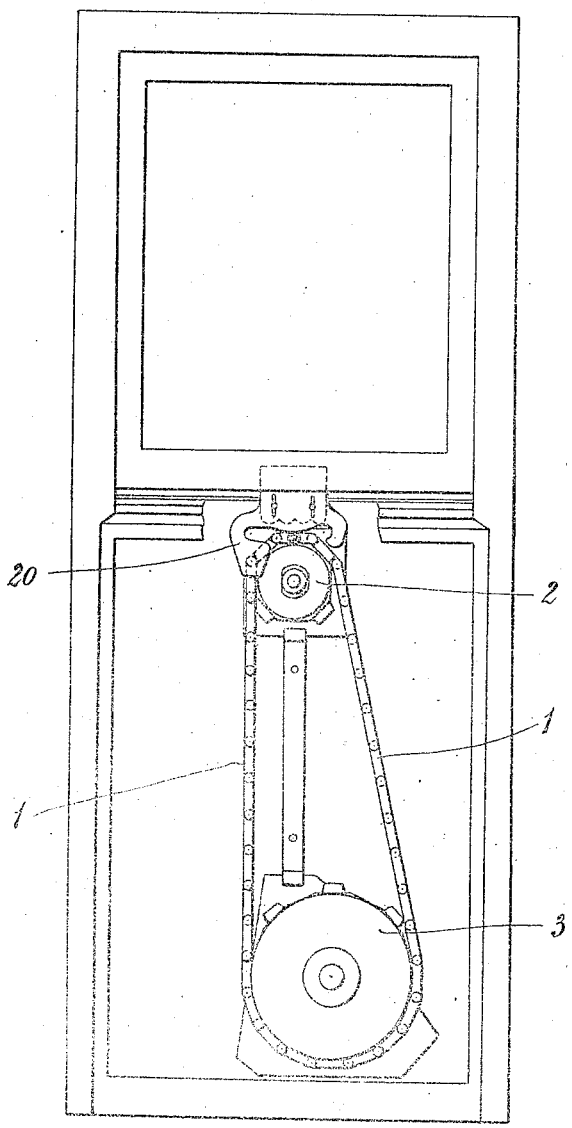
Figure 2:
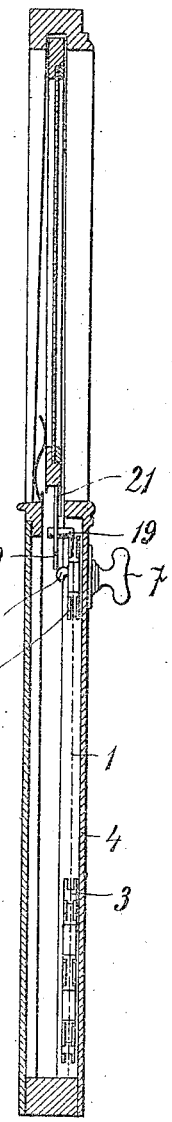

Referring to the drawings which form a part of this specification it shows an arrangement for opening and closing carriage windows, embodying the present improvement in which, Figure 1 is an elevation, Fig. 2 a vertical cross section of the arrangement, Figs. 3 and 4 respectively front and back views of the chain pinion, Fig. 5 a vertical section of the latter, with the locking arrangement for securing the apparatus in position, Figs. 6 and 7 are details and Fig. 8 shows an alternative form of the pinion, Fig. 9 shows a section of an alternative form of the locking device for securing the pinion, and Figs. 10 and 11 are respectively a back view and cross section of the latter. Figs. 12 to 14 show, respectively, a front elevation, cross section and plan of another form of the connecting or cam plate to be attached to the carriage window.

The arrangement illustrated shows a known arrangement comprising two chain-wheels 2 and 3, connected by a chain 1, and which are supported in the side of the carriage 4, which at the same time is designed to receive the lowered window. The chain-wheels are provided with teeth arranged in parallel pairs 5, Figs. 3, 4, 5, 9, 11, between which the links 6 of the chain formed of thin plate, set on edge, can lodge whereby the chain is more efficiently borne and guided. The upper chain-wheel 2 is driven direct by turning the handle 7, which is slid over the pin or spindle 8, Figs. 5 and 9.

In Fig. 5, the chain pinion 2 is firmly joined to a box 9, which can revolve in the bearing plate 10 and is provided on its front face with two projections or shoulders 11, placed diametrically opposite each other, and against which two oppositely projecting arms 12, of the pin 8, are made to bear when the handle 7 is turned, so that the chain pinion is made to revolve with the handle. But before this can be done the chain pinion must be released, by disengaging the locking arrangement which secures the chain pinion in position in the known manner. This locking arrangement consists of a bolting device 13, loosely slid over the pin 8, and which by means of two projections 14 (Figs. 5 and 6) protruding through recesses in the bearing plate 10, catches into suitable notches 15 in the chain pinion (Fig. 4). For the purpose of bringing the locking arrangement into action the box 9 carrying the chain pinion is provided, on the side facing toward the extensions or arms 12 of the pin, on either side of the projections 11 (Fig. 7) two slide-faces 16 ascending toward the latter projections, and against which the arms 12 of the pin are constantly pressed, by a spring 17 inserted in the box 9. When the pin is turned, its arms 12 ride on the slanting faces 16 and thus push the pin forward, so that the bolting device 13 is also pushed forward and its projections are disengaged from the notches of the pinion, so that when the pin 8 is turned farther, the pinion will be made to revolve with the pin by the arms 12 of the pin bearing against the shoulders or projections 11 of the pinion. As soon as the handle 7 is released the pinion is locked again in position, by means of the spring 17 which forces the pin 8 backward, and at the same time the bolting device is also carried back, by a shoulder 18 on the pin, until it catches into the notches of the pinion. At the same time the pin is made to revolve, by its arms 12 riding on the slanting faces 16, so that it is brought back again into the position shown in Fig. 7, in which the arms 12 are half-way between the two projections 11, so that, when the handle 7 is once more turned the bolting device is in the first place released, and thereafter the pinion is set in motion.

According to Figs. 9 to 11, the chain pinion 2', with its nave 8', is borne so as to revolve in a box 10' belonging to the bearing plate 10. The projections or shoulders 11', as well as the slanting slide faces 16', are arranged on the back of the pinion 2' itself. The bolting device 13' is fitted loosely upon the farther end of the pin 8 and engages by means of its locking pins 14', (protruding through two holes 15' in the pinion 2',) the notches 10" of the bearing 10'. The spring 17', which presses the arms 12' of the pin 8 against the slide faces 16' is arranged between the nave 8' of the pinion and the handle 7, both nave and pinion being suitably recessed. When the pin 8 is turned, its arms 12' ride on the inclined faces 16', causing the pin 8 to be displaced longitudinally, backward, while at the same time the bolt arrangement 13' is also displaced backward, and its locking pins 14' are disengaged from the notches 10" of the bearing box 10', so that, when the pin 8 is turned farther and its arms 12' are made to bear against the projections or shoulders 11', the pinion 2' is made to revolve. As soon as the handle 7 is released the pinion 2' is locked again by the spring 17, essentially in the same way as in the locking arrangement first described.

The moving of the window is effected in the known manner by means of the cam projection 19 on the chain 1, which catches into the connecting plate or cam plate 20 attached to the carriage window. This plate 20 is attached to the window, by means of a second connecting plate 21 (Figs. 2 and 13). These two connecting plates are arranged displaceably so that they can be adjusted and fixed in the desired position relatively to each other, so that the connecting plate acted upon by the projection on the chain can be adjusted at will even when attached to the window.

The beveled shoulder 22 and the stop or catch 23 of the chain 1 serve, in the known manner, to press the window, when raised, against the weather-rail, and, respectively to limit the lift of the window, while the catch or stop 23 strikes when in the corresponding position, against pins 24 arranged on the bearing plates of the two chain-wheels.

For heavy windows, the driving wheel fitted with double teeth, (Fig. 8) is provided, in the known manner, with an inside gearing 26, into which the pinion 25 gears, which is otherwise constructed as shown in Figs. 5 or 9. The pressing of the raised window against the weather rail can also be attained by giving the connecting plate 20 a peculiar form, being provided, along its guiding edge which is acted upon by the projection 19 (Figs. 12 to 14) with a bearing fillet 27, beveled off at both ends and against which a projection or shoulder 28 of projection 19 bears when the window is raised, thus pressing the connecting plate, and the window outward and thus forcing the window over the weather rail. The window will then remain in this position until the projection 28, in the course of its travel, reaches the other end of the fillet 27, when the window, already lowered a little, is again forced inward, along the beveled surface of the fillet, by a pressure spring 29 of the usual kind.

Having now described my invention, what I claim as new and desire to secure by Letters Patent is:

1. In a device for moving and fastening carriage windows with chain gear, a chain pinion having on one face shoulders (11, 11') and slanting surfaces (16, 16') on both sides of said shoulders ascending toward the same, a spindle (8) adjustable longitudinally and adapted to rotate the chain pinion, said pinion being provided at its inner end with perpendicular arms (12, 12'), a coiled spring (17, 17') surrounding the inner end of the spindle and adapted to press the said spindle arms (12, 12') against the said slanting surfaces of the chain pinion, a bolting arrangement (13, 13'), rotatably seated upon the spindle and having projections (14, 14'), in combination with notches on the chain pinion adapted to receive the projections (14, 14').

2. In a device for fastening and moving carriage windows, a chain drive, a projection (19) fixed to said drive, a plate (20) fastened to the window and provided with a guiding curve for the said projection, said plate having along the guiding curve a bearing fillet (27), in combination with a shoulder (28) on said projection adapted to engage the bearing fillet, substantially as set forth.

In testimony whereof, I have signed my name to this specification in the presence of two subscribing witnesses.

JOHANN ALTRICHTER.

Witnesses:
ALFRED KLOSS,
ROBERT W. HEINGARTNER.